Dec. 15, 1936.　　　G. A. LUBURG　　　2,064,675
AMPHIBIAN LANDING GEAR
Filed March 10, 1936　　　3 Sheets-Sheet 1

INVENTOR.
GUY A. LUBURG
BY
ATTORNEYS.

Dec. 15, 1936. G. A. LUBURG 2,064,675
AMPHIBIAN LANDING GEAR
Filed March 10, 1936 3 Sheets-Sheet 2
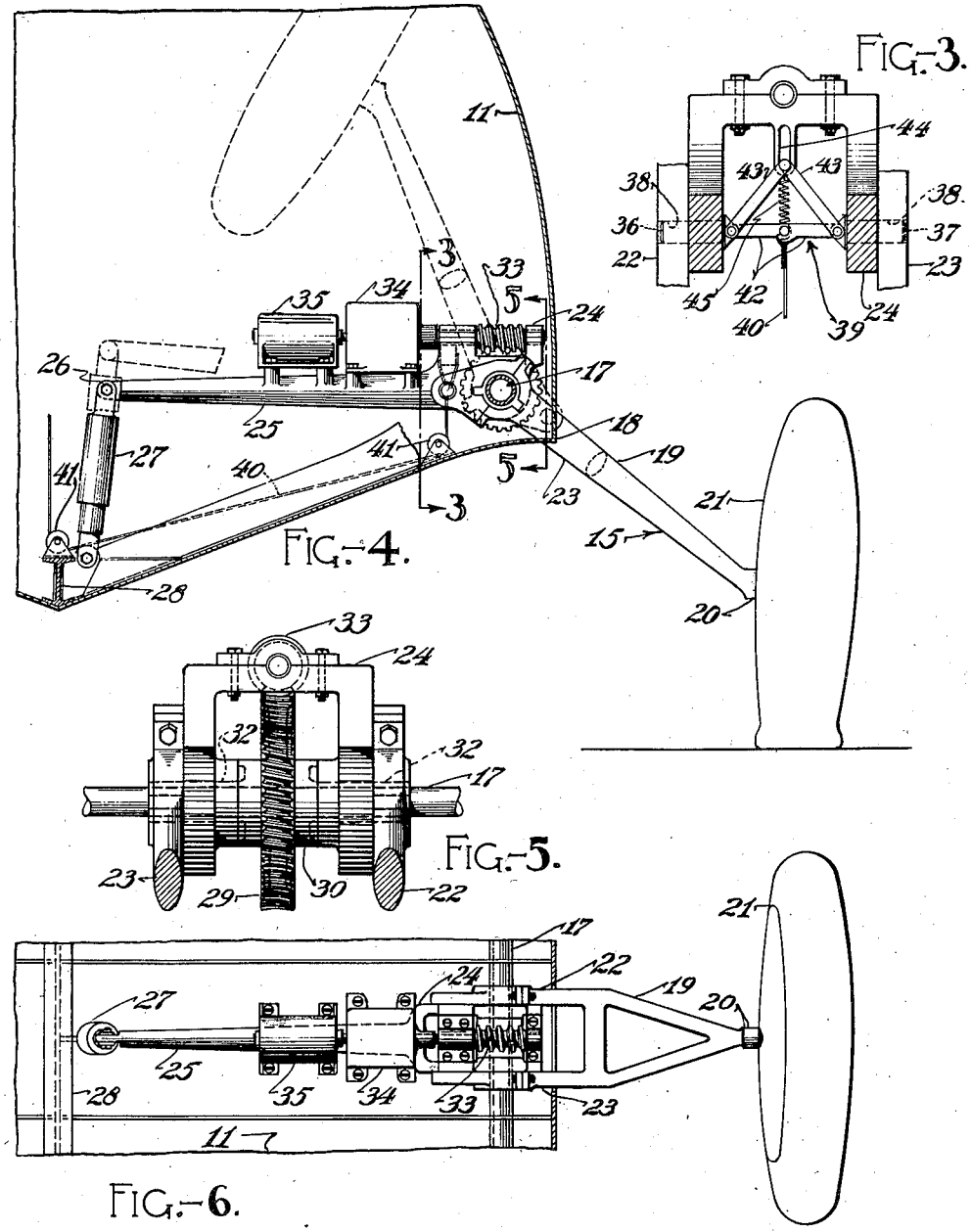
INVENTOR.
GUY A. LUBURG

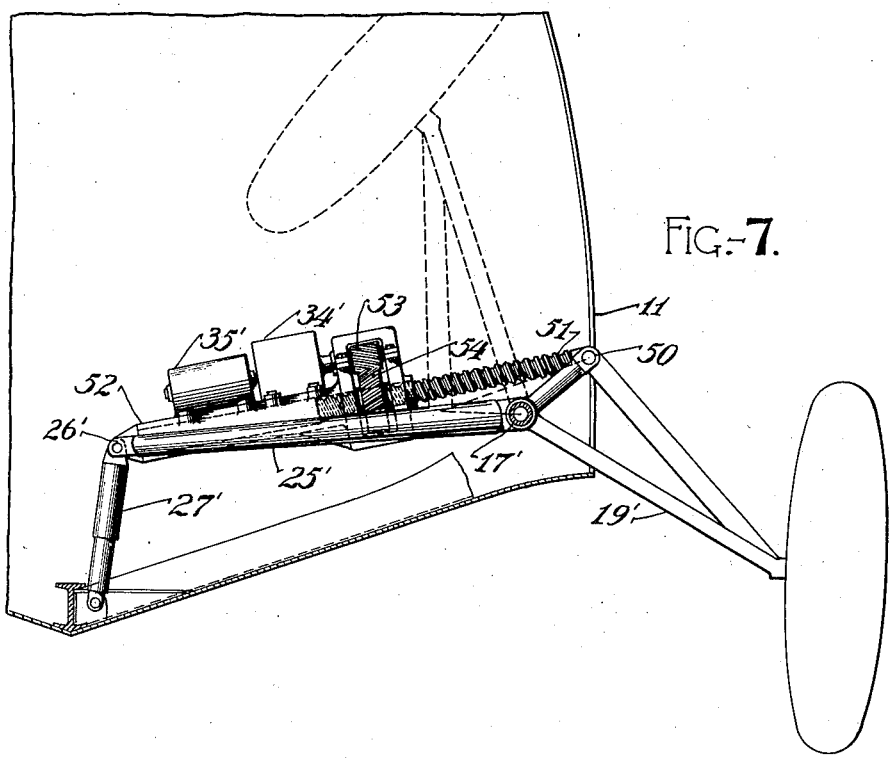
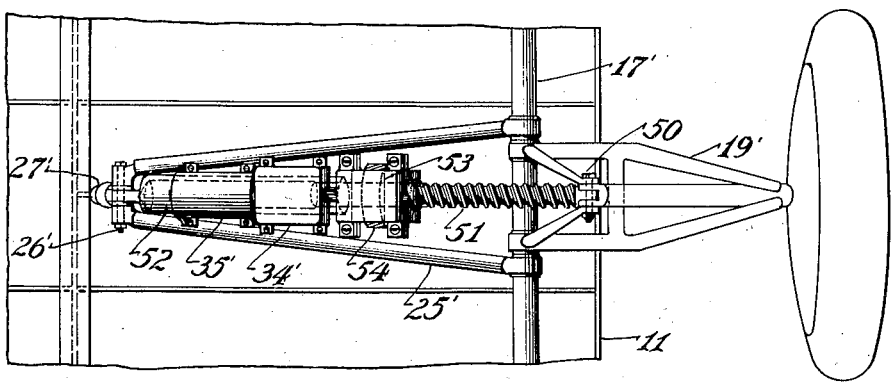

Patented Dec. 15, 1936

2,064,675

UNITED STATES PATENT OFFICE 2,064,675

AMPHIBIAN LANDING GEAR

Guy A. Luburg, Kenmore, N. Y., assignor, by mesne assignments, to Curtiss-Wright Corporation, a corporation of New York Application March 10, 1936, Serial No. 68,023

7 Claims. (Cl. 244—101)

This invention relates to aircraft landing gears, and is particularly concerned with improvements in retractable landing gears adapted for use on amphibian aircraft having a central pontoon or float.

Objects of the invention are to provide a retractable amphibian landing gear of simplified form whereby the wheeled chassis may be completely withdrawn into the airplane float.

A further object is to provide a cantilever type of retractable landing gear wherein a pair of cantilever struts are pivoted to a common axis, one said strut carrying a landing wheel, and the other said strut carrying a shock absorber acting against the pontoon hull, the two struts being movable relative to one another to effect extension and retraction of the landing gear.

For a clearer conception of the details of the organization, reference may be made to the annexed description and to the drawings, in which:

Fig. 3 is an enlarged section on the lines 3—3 of Fig. 4;

Fig. 4 is a section through the pontoon hull showing the landing gear in detail;

Fig. 5 is a section on the line 5—5 of Fig. 4;

Fig. 6 is a plan of the landing gear showing part of the pontoon in section; and Figs. 7 and 8 are, respectively, section and plan of an alternative form of the landing gear.

Figure 1:
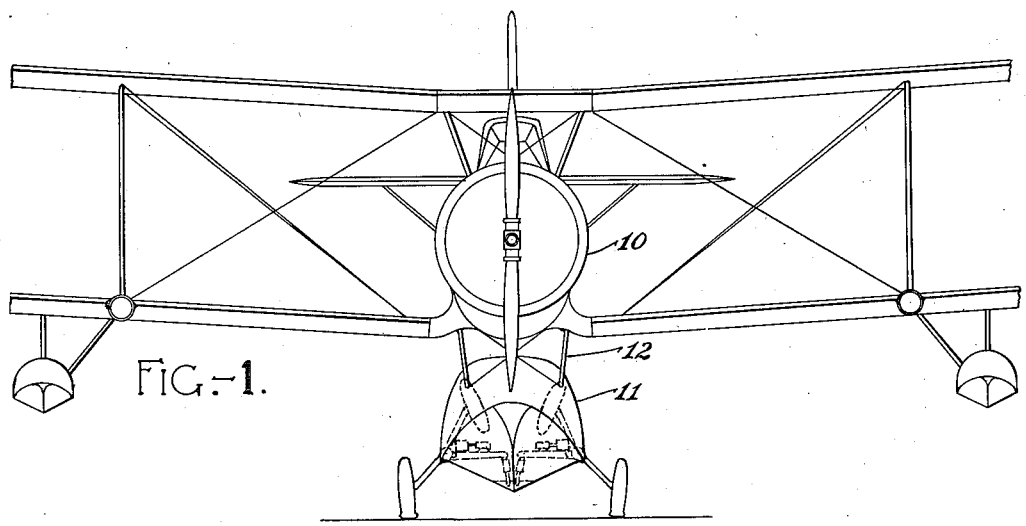
Fig. 1 is a front elevation of an aircraft embodying the invention.
Figure 2:
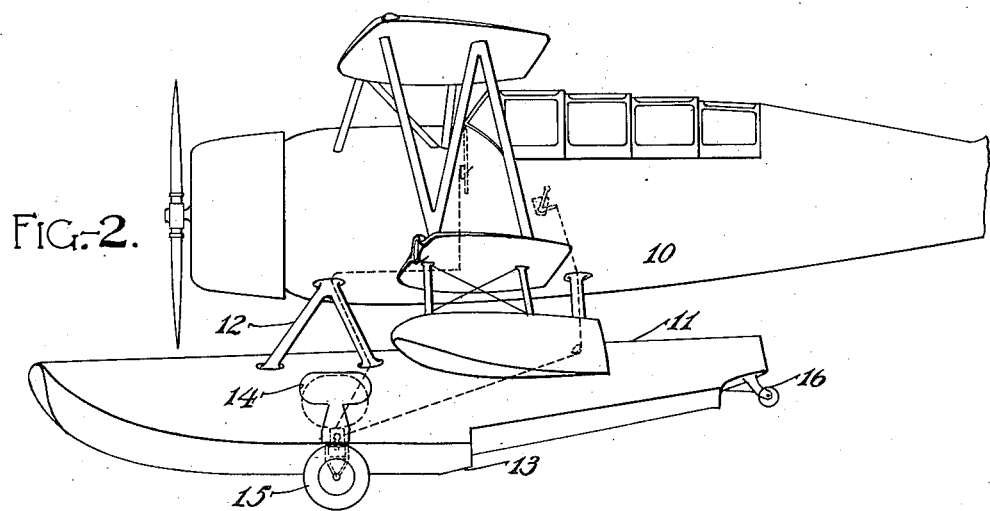
Fig. 2 is a side elevation of the aircraft.

Referring briefly to Figs. 1 and 2, I show a conventional tractor biplane 10 carrying therebelow a single pontoon 11 by means of struts 12. The pontoon, forward of the step 13, is provided with a recess 14 on each side, each adapted to receive a landing gear organization 15, one such organization being provided for each side of the pontoon. The conventional tail wheel 16 of fixed or retractable type may be provided at the rear of the pontoon.

Referring now to Figs. 3 to 6, inclusive, wherein are shown the details of construction of one form of one of the landing gear units 15, a stout shaft 17, with its axis parallel to the longitudinal axis of the aircraft, is anchored to the float adjacent to the chine 18 thereof, and upon this shaft is journaled a forked strut 19, the outer end of the strut being formed as a stub axle 20 carrying a landing wheel 21. Forked ends 22 and 23 of the strut 19 embrace a forked end 24 of an inboard cantilever strut 25, the forked ends 24 also being journaled upon the shaft 17. The inner end of the strut 25 is shackled at 26 to one end of a compression shock absorber 27, the other end of which is shackled adjacent the keel 28 of the pontoon. As shown in Fig. 5, a central worm wheel 29 is carried on a hub 30, said hub having sleeve extensions 32 extending through the bores of the forked ends 24, and upon which the forked ends 22 and 23 are clamped, so that the strut 19 turns with the worm wheel 29 upon the shaft 17. A worm 33 is journaled in the fork 24 of the shaft 25, the worm engaging the wheel 29, and said worm is directly connected through a gear box 34 of conventional construction, to an electric motor 35, both the gear box 34 and the motor 35 being mounted upon the strut 25. Now, it will be seen that the motor may be energized to turn the worm 33 by which the angular relationship of the struts 19 and 25 may be changed, and the parts are so organized that the strut 19 may be moved to an extended position such as is shown in solid lines in Fig. 4, or to a fully retracted position shown in dotted lines in Fig. 4. When the landing gear is extended and landing shocks are imposed on the wheel 20, the struts 19 and 25 swing together about the shaft 17 and the landing shocks are absorbed by the shock absorber 27. When the landing gear is retracted, the strut 19 is simply moved with respect to the strut 25 by the operation of the electric motor.

When the landing gear is in its extended position, means are provided to lock the struts 19 and 25 together to avoid the imposition of landing loads upon the teeth of the wheel 29 and the worm 33. This locking organization is shown in detail in Fig. 3, and comprises opposed bolts 36 and 37 engaging openings in the fork 24 and adapted to register with suitable openings 38 in the fork ends 22 and 23. In order to move these bolts simultaneously, a toggle linkage 39 is provided between the ends of the fork 24, the bolts being movable by a manually controlled cable 40 extending over suitable sheaves 41 to the pilot's compartment. The linkage 39 comprises opposed links 42 pivoted centrally to each other and at their ends to the bolts 36 and 37. A pair of upper links 43 are also pivoted at their adjacent ends to each other at their remote ends to the bolts 36 and 37, but the pin forming the common joint is guided in a vertical guideway 44. A spring 45 serves to urge the bolts toward a locking position, and the links 43 make certain that both bolts will move simultaneously in the same amount. It will be noted that the lock organization of Fig. 3 may only be engaged when the landing gear is fully extended.

Now referring to Figs. 7 and 8, I show an alternative organization wherein the wheel carrying strut 19' is provided with an offset knuckle 50 and from this knuckle an inwardly extending lead screw 51 projects. The inboard strut 25' is bifurcated to embrace a carrier 52, pivoted at its inner end upon the upper shock absorber pivot 26'. Said carrier 52 comprises a frame upon which the gear box 34' and the motor 35' are respectively carried. The gear box serves to drive a pinion 53 engaging a member 54 upon the outer surface of which are formed gear teeth engaging the teeth of the pinion 53, and within the bore of which are formed integral threads engaging the threads of the lead screw 51. The member 54, then, serves as a nut which may be rotated by the energization of the motor 35' to extend and withdraw the lead screw 51 with respect to the carrier 52. By such extension and retraction of the lead screw, the wheel carrying strut 19 is raised or lowered to correspond to the retracted or extended landing gear positions. The carrier 52 may oscillate slightly on the pivot 26' with respect to the bifurcated strut 25' as the knuckle 50 moves with the strut 19' and vertically with respect to the fixed shaft 17'.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an amphibian landing gear for aircraft, a float for water landing, having a keel and a chine spaced laterally therefrom, a pivot at said chine, a lever extending substantially from the keel plane, through said pivot and outwardly beyond said chine, a shock absorber strut connecting the inner lever end with said keel, a buckling joint in said lever, and means for buckling said lever about said joint for raising the outer end of said lever.

2. In an aircraft landing gear, an inboard, substantially horizontal strut pivoted near the aircraft surface for vertical swinging, a shock absorber connecting the other end of said strut with the aircraft, a cantilever strut swingable on said strut pivot for swinging in a transverse, vertical plane, and power means for moving said struts to variant angular positions with respect to each other, said struts, when said power means is not operating, being movable with each other about said pivot.

3. In an aircraft landing gear, an aircraft body having a fore-and-aft shaft near the covering thereof, an inboard strut journaled on said shaft, an outboard strut journaled on said shaft, means to lock said outboard strut in fixed position relative to said inboard strut so that both struts are swingable as a unit on said shaft, and means to move said outboard strut with respect to said inboard strut.

4. In an aircraft landing gear, an aircraft body having a fore-and-aft shaft near the covering thereof, an inboard strut journaled on said shaft, an outboard strut journaled on said shaft, means to lock said outboard strut in fixed position relative to said inboard strut so that both struts are swingable as a unit on said shaft, means to move said outboard strut with respect to said inboard strut, said means comprising a worm wheel coaxial with the shaft and rotatable with one said strut, a worm, engaging said wheel, journaled on and rotatable with respect to the other said strut, and power means on said other strut for rotating said worm.

5. In an aircraft landing gear, an aircraft body having a fore-and-aft shaft near the covering thereof, an inboard strut journaled on said shaft, an outboard strut journaled on said shaft, means to lock said outboard strut in fixed position relative to said inboard strut so that both struts are swingable as a unit on said shaft, means to move said outboard strut with respect to said inboard strut, said means comprising a screw shaft pivoted to one said strut at a point spaced from the shaft axis, and a power driven rotatable nut journaled on the other said strut and engaging said screw shaft, said first strut being moved relatively to said other strut in response to screw shaft translation due to nut rotation.

6. In an aircraft landing gear, a pair of forked end strut members journaled on a common shaft, the fork of one embracing the fork of the other, said forks having opposed openings axially parallel to the shaft, a pair of bolts engaging the openings of the inner fork and movable, when the outer fork openings are aligned with the inner, to engage the outer fork openings to lock the two forks from relative movement.

7. In an aircraft landing gear, a pair of forked end strut members journaled on a common shaft, the fork of one embracing the fork of the other, said forks having opposed openings axially parallel to the shaft, a pair of bolts engaging the openings of the inner fork and movable, when the outer fork openings are aligned with the inner, to engage the outer fork openings to lock the two forks from relative movement, and pantograph means operable to move both bolts simultaneously into and out of engagement with said outer fork openings.

GUY A. LUBURG.